Nov. 12, 1957     R. G. DIQUATTRO ET AL     2,812,633
APPARATUS FOR COOLING HOT GAS MANIFOLDS
Filed Sept. 11, 1953

INVENTORS
ROBERT G. TOWLE
BY ROBERT G. DIQUATTRO
ATTORNEY

United States Patent Office 2,812,633
Patented Nov. 12, 1957

2,812,633

APPARATUS FOR COOLING HOT GAS MANIFOLDS

Robert G. Diquattro, Elizabeth, N. J., and Robert G. Towle, New City, N. Y., assignors to Specialties Development Corporation, Belleville, N. J., a corporation of New Jersey Application September 11, 1953, Serial No. 379,654

4 Claims. (Cl. 60—30)

This application relates to injection apparatus and, more particularly, to single shot injection apparatus for directing a coolant into the exhaust manifold of internal combustion engines.

It has long been known that fire is one of the greatest hazards attendant upon the crash of a craft or vehicle, such, for example, as an airplane. Tests have indicated that a substantial percentage of the fires which start upon, or immediately after, the impact of a crash, are caused by leaking fuel or oil, or vapors thereof coming into contact with hot parts of the craft or vehicle, the hottest part being the engine exhaust manifold and therefore the most hazardous.

Accordingly, an object of the present invention is to provide apparatus for injecting a liquid under pressure into an aircraft exhaust manifold, in the event of a crash or other emergency, to cool the same and to quickly reduce its temperature to below the flash point temperature of the fuel or oil carried by such craft.

Another object is to provide such apparatus wherein the operative elements are protected from the hot gases and other foreign matter in the manifold during normal operation of the craft or vehicle and are not exposed until such time as they are placed in operating position.

Another object is to provide such apparatus which is disposed with respect to the manifold so as to assure diffusion of the cooling medium, upon its introduction into the manifold, to cover substantially all of the interior thereof.

Another object is to provide such apparatus which is readily accessible and is easily serviced.

A further object is to provide such apparatus which is simple but rugged in construction, efficient in its operation and which does not interfere with the efficient operation of the manifold in conducting exhaust gases therethrough.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects may be accomplished by providing injection apparatus in the form of a device generally comprising a housing having a bore therethrough provided with inlet means at one end for admitting fluid under pressure and an outlet at the opposite end, a frangible member obstructing the outlet of the bore, and piston means in the bore adapted to burst the frangible member under the influence of fluid under pressure admitted by the inlet means and acting thereon, the piston means including nozzle means in communication with the inlet means adapted to extend through the outlet upon bursting of the frangible member to direct a spray of fluid under pressure therethrough and into the manifold.

More specifically, one, or a plurality, of such devices may be mounted on the manifold so that upon bursting of the frangible members by the piston means, the spray of fluid through the outlet is directed into the manifold to wet substantially the entire internal area thereof.

A preferred embodiment of the invention has been chosen for purposes of illustration and description, and is shown in the accompanying drawing, forming a part of the specification, wherein.

Figure 1:
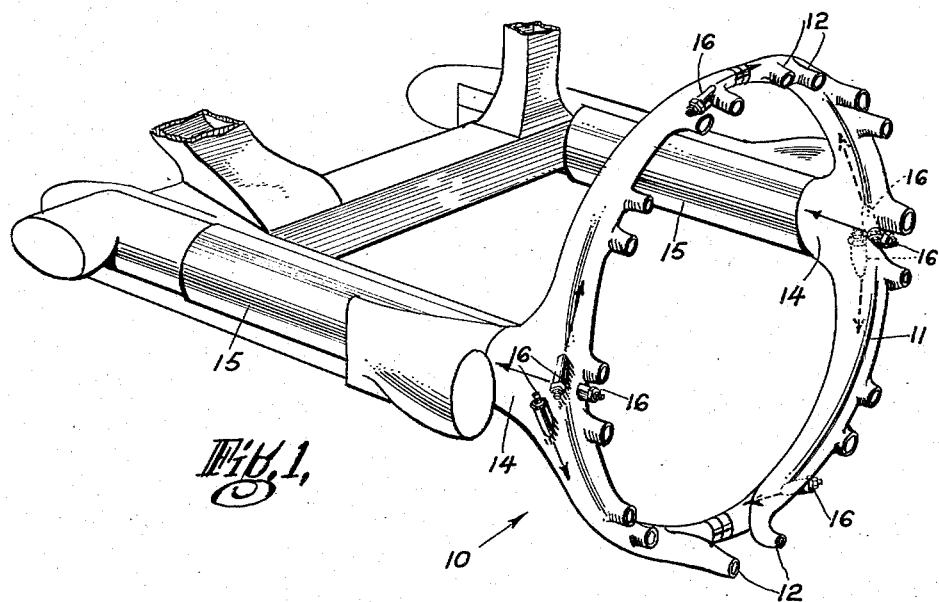
Fig. 1 is a perspective view of an exhaust manifold of a radial aircraft engine showing the location of a plurality of injection devices in accordance with the present invention.

Referring to the drawing in detail, and more particularly to Fig. 1 thereof, there is shown a conventional exhaust manifold 10 comprising a hollow circular collector ring 11 formed with a plurality of stacks 12 each adapted to be connected, by suitable piping, to an exhaust port of the cylinders of a conventional eighteen cylinder radial aircraft engine (not shown). The collector ring 11 is also provided with a pair of rearwardly extending exhaust ducts 14 for conducting hot gases from the ring to a pair of heat exchangers 15 which, in turn, discharge to the atmosphere. A plurality of short casings 16 are integrally secured to the manifold in preselected locations, as will be described hereinafter, for communication with the interior thereof. These casings serve as mounts for injection devices in accordance with the present invention.

Figure 2:
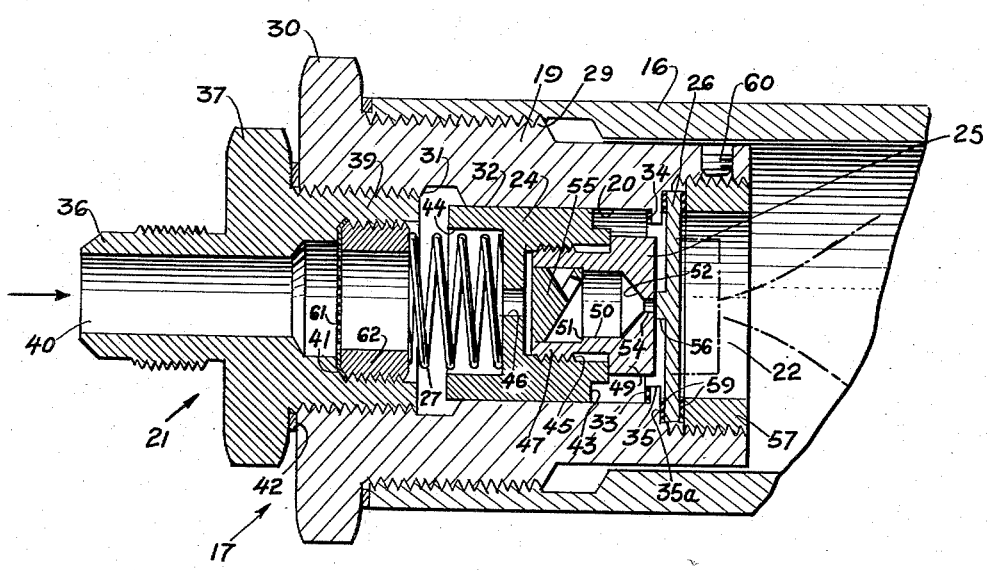
Fig. 2 is a longitudinal sectional view of an injection device in accordance with the present invention.

Referring now to Fig. 2, there is shown an injector device 17 generally comprising a housing 19 mounted in one end of one of the casings 16 and formed with a longitudinal stepped bore 20, an inlet fitting 21 threadedly secured to one end of the bore, an outlet 22 at the other end, a piston 24 slidably mounted in the bore between the inlet and the outlet, a nozzle 25 secured to one end of the piston for movement therewith, a frangible ceramic disc 26 obstructing the bore, and a helical spring 27 between the inlet fitting and the piston.

The housing 19 is a tubular member formed with external threads 29 adjacent a hexagonal flange 30 at one end thereof to facilitate threading the same into the casing 16 which is provided with corresponding internal threads, at the outer end thereof, for such purpose.

The bore 20 of the housing is provided with internal threads 31 at the flanged end, a cylinder portion 32 adjacent the threads 31, an inwardly extending annular flange 34 providing a shoulder 35 at the inner end of the cylinder portion, and an internally threaded portion of enlarged diameter forming the outlet 22 and an annular shoulder 35a within the outlet provided by the flange 34. An annular asbestos gasket 33 is seated on the shoulder 35 in the cylinder portion of the bore 20 for a purpose to be described hereinafter.

The inlet fitting 21 is formed with an externally threaded nipple portion 36 for fluid tight connection to a fluid supply line (not shown), a hexagonal flange 37 and a skirt portion 39 externally threaded for engagement with the threads 31 in the bore 20. The inlet fitting is also provided with a longitudinal bore 40, having a shoulder 41, in fluid flow communication with the bore 20 in the housing 19 at the flanged end thereof. A copper gasket 42 forms a seal between the flange 37 of the fitting 21 and the flange 30 of the housing 19.

The piston 24 is slidably mounted in the cylinder portion 32 of the bore 20 for longitudinal movement therein; and is formed with a central bore 44 facing towards the inlet fitting, a threaded central bore 45 facing towards the outlet 22 and a central bore 46, of reduced diameter, interconnecting the bores 44 and 45. The forward or inner end of the piston is of reduced outer diameter to provide a forwardly facing shoulder 43 adapted to engage the gasket 33 for the purpose to be discussed hereinafter.

The nozzle 25 comprises an externally threaded body portion 47 screw threaded into the bore 45 of the piston 24, and a head portion 49 of larger diameter, and integral therewith, which abuts the end of the piston. A longitudinal bore 50 extends through the body portion 47 and into the head portion 49 and is provided with an annular shoulder 51 in the body portion and an inwardly and forwardly tapered end wall 52 in the head portion. A central orifice 54 through the forward end of the head portion provides communication between the bore 50, at its reduced end in the head portion, and the bore 20. A suitable fluted spinner 55 for imparting rotary motion to a portion of the fluid under pressure entering the bore 50 from the inlet 21, is inserted into the bore 50 and abuts the annular shoulder 51.

The frangible disc 26 is formed of a suitable ceramic material, preferably of the refractory type which is capable of withstanding the high temperatures at which the exhaust gases pass through the manifold 10. This disc has an inwardly facing central boss or projection 56 for the purpose to be described, and is seated on the annular shoulder 35a in the outlet end of the bore 20. An externally threaded screw ring 57 is screw threaded into the outlet 22, which is provided with corresponding threads for such purpose, and serves to retain the disc 26 against the shoulder 35a. Annular asbestos gaskets 59 are inserted between the disc and the shoulder 35a and between the disc and the ring 57 to seal the bore 20 against the hot exhaust gases, and the foreign matter contained therein, which are discharged through the manifold. A set screw 60 is provided in the forward end of the housing 19 to prevent the ring 57 from becoming loose in the outlet 22, and thereby permitting the disc 26 to unseat and crack or rupture due to engine vibrations.

In order to prevent foreign matter from entering the bore 20 through the inlet to clog the bore 46, or the nozzle 25, a filter 61, such as a fine mesh screen, is inserted in the bore 40 of the inlet fitting, adjacent the shoulder 41, and is retained therein by a screw ring 62.

The helical spring 27 between the inlet fitting and the piston extends into the bore 44 and abuts the end wall thereof to urge the piston in a direction towards the outlet so that the face of the head portion 49 of the nozzle abuts the boss 56 on the disc 26 under an initial spring load. The springs prevents the piston from sliding back and forth in the bore 20, due to engine vibrations or rocking of the craft, and from repeatedly striking the boss 56 to shatter the disc.

The fluid which is directed into the manifold is adapted to quickly cool the same upon contact. For example, an inert liquid is preferred which has a high latent heat of vaporization and a low freezing point. Such a medium will not freeze in flight and will rapidly vaporize, upon contact with the hot manifold, to absorb the heat therefrom and to form an inert atmosphere therein.

In operation, in the event of an emergency, such as a crash or other occurrence, rendering the outburst of a fire imminent, a liquid cooling medium is released under pressure from a container (not shown) and is directed to the inlet fitting 21 through suitable conduits. The fluid medium passes through the filter 61 and into the bore 20 and the bores 44 and 46 of the piston 24. At the same time, the pressure of the medium acts against the end wall of the bore 44 in the piston causing the head portion 49 of the nozzle 25 to exert a force upon the boss 56 sufficient to burst the disc 26. The boss 56 receives the full force delivered by the piston so that the bursting moment arm extends from the periphery of the boss to that portion of the disc which is seated against the shoulder 35a. In this manner, it is possible to obtain the required bursting moment by exerting a relatively small force upon the boss 56.

As soon as the disc no longer obstructs the bore 20, the piston moves in a direction towards the outlet 22 until the shoulder 43 of the piston strikes the gasket 34 on the shoulder 35, whereupon the head portion 49 of the nozzle comes to rest in the outlet 22 of the bore 20, as shown in broken lines in Fig. 2.

Simultaneously, the fluid under pressure, passing through the bore 46 in the piston, enters the nozzle 25. The mass of fluid is then divided into a plurality of streams by the fluted spinner 55 which also imparts a rotary motion to a portion thereof. As the rotating streams come together and pass through the orifice 54 and into the conduit 16, the centrifugal force induced therein by the rotary motion thereof causes the fluid to enter the casing 16 and the collector ring 11 as a dense solid cone-shaped mist having its apex at the orifice 54.

It will be understood that the characteristics of the cone-shaped spray may be varied by modifications of the spinner and/or the orifice 54. For example, the nozzle may be adapted to deliver hollow cone-shaped sprays by providing spinners which impart rotary motion to all of the fluid entering the nozzle instead of to merely a portion thereof. Then too, the flow rate of the nozzle may be varied by well known modifications of the spinner and the orifice 54.

In the embodiment illustrated herein, it has been found that eight injectors are required to efficiently spray substantially the entire internal area of the manifold. Six of the injectors are mounted on the manifold as shown in Fig. 1, to cover the circular collector ring, each nozzle covering approximately sixty degrees thereof and projecting the fluid medium in the direction indicated, while two of the devices are mounted in a plane ninety degrees to the plane of the circumference of the ring and project the fluid medium into the exhaust ducts 14 and the heat exchangers 15, as indicated.

In the present embodiment, most effective coverage has been obtained by employing nozzles adapted to project solid cone-shaped sprays in the collector ring and hollow cone-shaped sprays in the exhaust ducts and heat exchangers, and by injecting the solid cone-shaped sprays into the collector ring in a direction such that the altitude of the cone is tangent to the average longitudinal axis of the ring. It will be understood, however, that the location and number of injection apparatus will vary according to the size and contour of the manifold to be protected.

From the foregoing description, it will be seen that the present invention provides novel injection apparatus capable of injecting a liquid under pressure into an exhaust manifold or the like to quickly cool the same. The apparatus is protected from the hot gases and other foreign matter in the manifold during normal operation of the engine, and is so disposed with respect to the manifold as to assure maximum diffusion of the liquid upon its introduction into the manifold without interfering with the efficient operation thereof.

It will also be seen that the present invention provides apparatus for cooling hot gas manifolds which is readily accessible, easily serviced, rugged in construction and efficient in operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. Apparatus of the class described comprising, in combination, generally circular exhaust gas manifold means; and injection means mounted on said manifold means including a housing having a bore therethrough disposed substantially tangentially with respect to said manifold means and provided with inlet means at one end for admitting fluid under pressure and an outlet at the opposite end communicating with said manifold means, a frangible member obstructing the outlet of said bore, and piston means in said bore arranged to burst said frangible member under the influence of fluid under pressure admitted by said inlet means and acting thereon, said piston means including nozzle means in communication with said inlet means and extending through said outlet upon bursting of said frangible member, said nozzle means including an orifice constructed and arranged to direct a substantially conical spray of fluid under pressure through said outlet and into said manifold means such that the axis of said spray is tangential to the average longitudinal axis of said manifold.

2. An injection device of the class described comprising a housing having a bore therethrough provided with inlet means at one end for admitting fluid under pressure and an outlet in the other end including a counterbore providing an outwardly facing shoulder, a frangible disc adjacent said shoulder obstructing the outlet of said bore and being formed with a central boss facing said inlet means, an annular ring secured in said counterbore for maintaining said disc in sealed relation with said shoulder, a piston in said bore formed with shoulder means and with a first axial bore at one end thereof facing said disc, a second axial bore in said piston facing said inlet means and a bore of reduced diameter connecting said bores in said piston, nozzle means mounted in said first axial bore extending beyond said piston and abutting said boss, said nozzle means including a spinner, said piston being in fluid seal relationship with said bore and movable therein in a direction towards said disc under the influence of fluid under pressure admitted by said inlet means to cause said nozzle means to burst said disc and to extend through said outlet upon bursting of said disc to direct a spray of fluid under pressure therethrough, an annular projection in said housing bore to engage said shoulder means to limit the movement of said piston upon bursting of said frangible disc and spring means in said bore normally urging said piston in a direction to cause said nozzle means to abut said boss.

3. Apparatus according to claim 2, wherein said inlet includes a centrally bored fitting formed with an annular internal shoulder, filter means abutting said internal shoulder, and an annular ring in threaded engagement with said fitting to maintain said filter means in shoulder abutting position and serving as a seat for said spring means.

4. Apparatus of the class described comprising, in combination, generally circular exhaust gas manifold means including an annular passageway of varying diameter; and a plurality of injection means mounted on said manifold means, each of said injection means including a housing having a bore therethrough disposed substantially tangentially with respect to said manifold means and provided with inlet means at one end for admitting fluid under pressure and an outlet in the other end in communication with said passageway, a frangible disc obstructing the outlet of said bore formed with a central boss facing said inlet means, a piston in said bore formed with shoulder means and with an axial bore at one end thereof facing said disc and in communication with said inlet means, nozzle means mounted in said axial bore abutting said boss, said piston being arranged to move in a direction towards said disc under the influence of fluid under pressure admitted by said inlet means to cause said nozzle means to burst said disc and to extend through said outlet upon bursting of said disc, said nozzle means including an orifice constructed and arranged to direct a substantially conical spray of fluid under pressure through said outlet and into said manifold means such that the axis of said spray is tangential to the average longitudinal axis of said manifold means, stop means formed in said bore to engage said shoulder means to limit the movement of said piston upon bursting of said frangible disc and spring means in said bore normally urging said piston in a direction to cause said nozzle means to abut said boss.

References Cited in the file of this patent

UNITED STATES PATENTS

| 1,311,774 | Ritter | July 29, 1919 |
| 1,696,298 | Graham | Dec. 25, 1928 |
| 1,853,805 | Elder | Apr. 12, 1932 |
| 2,280,953 | Huntoon | Apr. 28, 1942 |
| 2,493,982 | Lee | Jan. 10, 1950 |
| 2,515,068 | Young | July 11, 1950 |

FOREIGN PATENTS

| 339,744 | Great Britain | Dec. 18, 1930 |
| 574,874 | Great Britain | Jan. 24, 1946 |
| 336,303 | Germany | Apr. 21, 1921 |